United States Patent
Roesler et al.

(10) Patent No.: US 6,515,624 B1
(45) Date of Patent: Feb. 4, 2003

(54) METHOD OF DETERMINING THE LOCATION OF A HIGH FREQUENCY EMITTER

(75) Inventors: Daniel P. Roesler, Newhall, IA (US); Erik C. Buehler, Manhattan, KS (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/892,406

(22) Filed: Jun. 27, 2001

(51) Int. Cl.[7] .................................................. G01S 3/02
(52) U.S. Cl. ...................................................... 342/453
(58) Field of Search ................................. 342/453, 450, 342/457, 463; 455/456

(56) References Cited

U.S. PATENT DOCUMENTS 4,176,357 A * 11/1979 Fales, III .................. 343/112 R
4,215,345 A * 7/1980 MacDoran ............... 343/112 R
6,259,924 B1 * 7/2001 Alexander et al. .......... 455/456

* cited by examiner

*Primary Examiner*—Dao Phan
(74) *Attorney, Agent, or Firm*—Nathan O. Jensen; Kyle Eppele

(57) ABSTRACT

A method for determining the location of a high frequency emitter when the location of the emitter is unknown. The signal broadcast from the emitter is observed. Based on the time of the broadcast, the frequency of the broadcast, and the observed signal to noise ratio of the broadcast, it is possible to determine areas where the emitter is likely to be located. Several observations of the signal are compared to find an intersection of all areas where the emitter is likely to be located. The area of intersection is the most likely location of the emitter.

19 Claims, 8 Drawing Sheets

METHOD OF DETERMINING THE LOCATION OF A HIGH FREQUENCY EMITTER

BACKGROUND OF THE INVENTION

The present invention relates to a method of predicting the location of a high frequency emitter based on observation collected regarding the signal propagated by the emitter.

High frequency (HF) signals, those signals between about two and about thirty megahertz, can be used to communicate various forms of data over long distances. HF broadcasting systems have a variety of uses in commercial, governmental, and defense situations and are particularly useful for providing communication in areas lacking the infrastructure that would allow for more conventional communication methods. Thus, HF broadcasting systems are used by people in remote areas of the world who do not have access to telephone service, and are used by landowners who own large tracts of land and who wish to communicate across these large expanses.

Over the last thirty to forty years, tremendous resources have been dedicated to understanding and predicting the propagation of HF signals throughout the world. One source of innovation regarding signal propagation prediction is the Voice of America, an international broadcasting service supported by the U.S. government. Launched in 1942, the goal of the Voice of America has been to broadcast news to all areas of the world, especially to closed and war torn areas. In working towards this goal, the Voice of America has collected mass amounts of data regarding signal propagation. This data was used by the U.S. Naval Research Laboratory and the Institute for Telecommunication Sciences of the Department of Commerce to develop the Voice of America Coverage Analysis Program (VOACAP).

VOACAP is a powerful tool for predicting the expected performance of HF broadcasting systems. VOACAP is capable of point to point predictions, area coverage predications, and signal to noise to interference calculations. With the advent of modern computers having increased computing power and speed, it has become possible to make the technology of VOACAP more widely available. The current version of VOACAP is available in a Windows format and can be downloaded for free over the Internet. The source code for VOACAP is likewise available for free over the Internet.

Though a very powerful tool for analyzing signal propagation, VOACAP is also very difficult for any but the most experienced user to use. More recently, other software packages have been developed which organize and interrelate years of collected data in a useful manner to aid in signal propagation prediction. One such example is PropMan2000™, available from Rockwell Collins, which includes a graphical user interface to VOACAP in an attempt to make VOACAP easier to use.

Signal prediction software, such as VOACAP and Propman, is typically capable of many types of propagation analysis. HF system performance is dependent on a complex relationship of many factors, the most important of which include the time of day, solar conditions, the frequency used, and the signal to noise ratio of the signal. When using the software, it is possible to predict the area of coverage the signal will have based on these factors and certain other characteristics of the signal, including the type of antenna, the strength or power of the signal, and the location. It is also possible to graphically represent the signal to noise ratio and other propagation parameters.

Though there are many tools available for mapping the coverage area of a given signal, there are fewer tools available for determining the location of the an emitter which is broadcasting an HF signal. Currently, when attempting to determine the location of a HF emitter, several vertical antennas must be positioned in a large ring for receiving signals from the emitter. Such a system requires real hardware, must be done in real time and with real data. It is not only time consuming, but also very expensive given the hardware requirements.

Thus, there is a need in the art for a method of locating a signal emitter which is inexpensive and which does not require extensive hardware.

BRIEF SUMMARY OF THE INVENTION

The present invention is a method of determining a location of an emitter based on observations of the signal being broadcast by the emitter. If the location of an emitter is unknown, several observations of the broadcast signal are collected. The observations may be collected using several stations positioned throughout the globe, or may be collected at a single observation station. Each time the signal is observed, a parameter of the signal, such as the observed signal to noise ratio, is recorded. Based on the location of the observation station, the frequency of the observed signal, the time at which the signal is observed, and the observed signal to noise ratio, it is possible to generate location data indicating a likely location of the emitter. This data is generated for each observation. Next, the location data from all of the observations is compared to determine areas of overlap. An area of intersection where location data from each observation overlaps is the likely location of the emitter.

DETAILED DESCRIPTION

Figure 1:
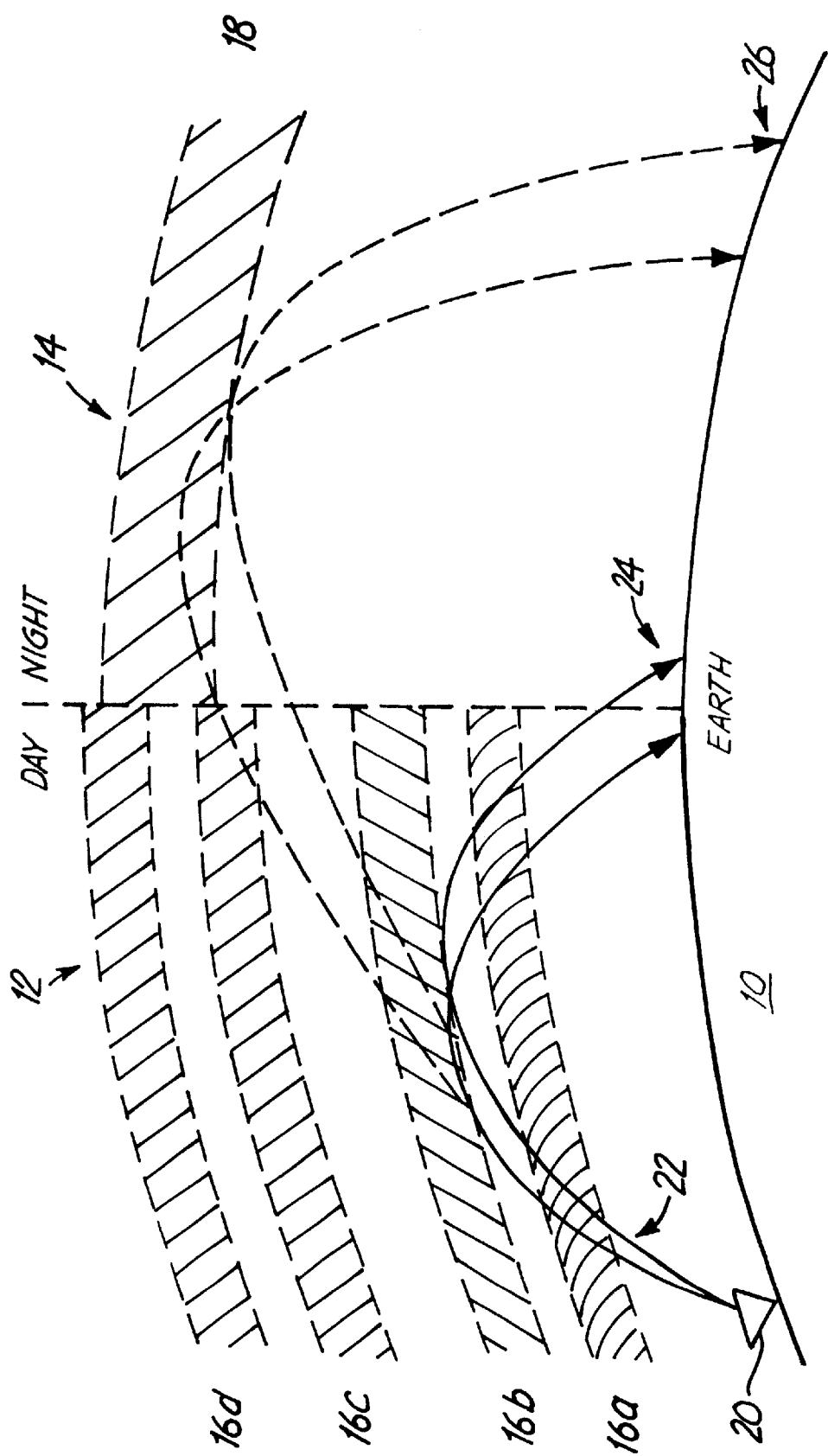
FIG. 1 is a diagram illustrating the earth's surface and the ionosphere.

FIG. 1 is a diagram illustrating the ionosphere above the earth's surface and its effects on high frequency signal propagation. Shown in FIG. 1 is the earth 10 and its atmosphere during the day 12 and at night 14. During daylight hours, the sun energizes the atmosphere to create four layers 16a–16d of ionization. These layers 16a–16d are made up of ions and free electrons in sufficient amounts as to allow reflection and refraction of electromagnetic waves. The first of these layers 16a is called the D-layer and occurs at between about 50 to 95 kilometers. The second layer 16b, the E-layer, occurs at about 95 to 135 kilometers. The third layer 16c, called the $F_1$ layer, occurs at between about 160 to 250 kilometers, and the fourth layer 16d, called the $F_2$ layer, occurs at between about 250 to 400 kilometers. In contrast, at night the sun has as much smaller effect on the atmosphere, and there is only one layer of ionization 18.

This layer 18 is called the F layer and occurs between the $F_1$ and $F_2$ layers exhibited during the day.

Also shown in FIG. 1 is a transmitter 20 transmitting high frequency signals 22. During the day, signals 22 transmitted from the transmitter 20 will "bounce" off the E layer 16b of the ionosphere and will return to the surface of the earth 10 at a location 24 some distance from the location of the transmitter 20. Due to the difference in the ionosphere between day 12 and night 14, the same signals 22 travel a much different path at night. At night, the signals 22 reflect off the F layer 18 and at return to the surface of the earth 10 at a location 26.

In addition to the ionization of the atmosphere, many other factors interact in a complex manner to affect the propagation characteristics of an HF signal. In particular, HF system performance is affected by solar activity, the time of day, the day of the year, and the details of the signal path. Solar activity has been studied at length and it has been discovered that there is an 11 year solar cycle that affects HF signal propagation. The effects of this solar activity thus varies over time. The geometry of the signal, such as the take off angle of the signal relative to the surface of the earth, also affects its propagation. Several computer programs are available for analyzing all the factors affecting HF signal propagation to predict HF system performance. In particular, the software program VOACAP is a very powerful tool which can be used to predict many aspects of the expected performance of HF broadcasting systems.

The present invention makes use of VOACAP to predict and analyze signal propagation. However, instead of utilizing VOACAP to predict an area of coverage for a particular transmitter, the present invention provides a method of determining a location a transmitter based on the signal received from that transmitter. The following FIGS. 2–6 illustrate the present invention. FIGS. 2–6 are for example purposes only, and are not based on an actual scenario.

Figure 2:
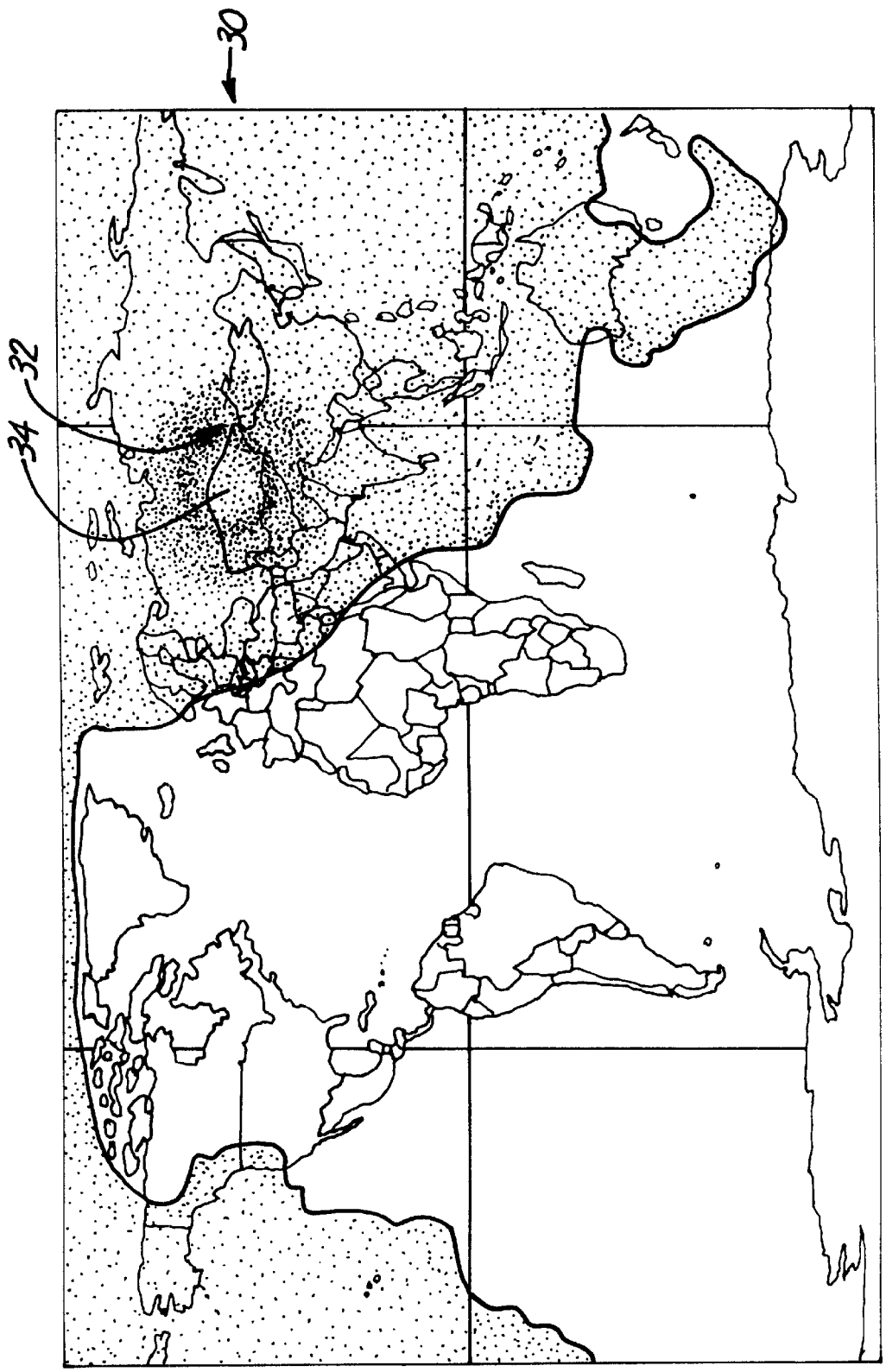
FIG. 2 is a map indicating the coverage scenario of a transmitter.

FIG. 2 is a map indicating the coverage scenario of a transmitter transmitting a HF signal. The map contains contours 30, 32 corresponding to the area of coverage of a HF signal being broadcast by the transmitter. Two areas 30, 32 are shown indicating areas where the signal propagates. An area 32 generally forms a circle around the location of the transmitter. This area 32 is the location where the signal is the strongest. An area 34 in the center of the circle is a skip zone and corresponds to an area where the signal is very weak. The skip zone 34 is the area between the farthest points at which the ground wave can be received and the nearest points at which reflected sky waves can be received. A coverage map such as that illustrated in FIG. 2 may contain multiple contours to indicate the location and relative signal strength of the transmitted signal.

The map shown in FIG. 2 is a typical propagation coverage map. Though such maps can be made using a variety of software options, discussion will focus on VOACAP because of its widespread use in the field. To create such a map using VOACAP, certain data must be entered into the program. At a minimum, data relating to the transmitter location, the frequency of the signal, the time of the broadcast, and information relating to the solar cycle must be entered. VOACAP accounts for the effects of solar activity by assigning a sunspot number (SSN) to each day of each month in a given year. Other data may also be entered to improve the accuracy and resolution of the map.

For the map shown in FIG. 2, the broadcast occurred at 12 universal time (UT) Jun. 21, 2000, from Qaraghandy, Kazakhstan. Qaraghandy is located at 49.83N (latitude), 73.17E (longitude). The power of the transmitter was 5 kilowatts and the frequency at which it broadcasted was 10 megahertz. The man-made noise at the receiver was set to −145 decibels. For this date, the associated sun spot number was 100.

The antenna used was isotropic, had zero gain, and had a bearing of 45 degrees. The take-off angle of the signal was 3 degrees. When plotting this information on the map, 5 degrees resolution was used.

The present invention utilizes this same technology to determine the location of an unknown emitter. For purposes of illustration, FIGS. 3–6 assume that the location of the transmitter described above is unknown. Using the present invention, it is possible to predict the location of the Qaraghandy transmitter based on observing its signal from three different receivers spaced throughout the world. For clarity, with reference to the following FIGS. 3–6, the location of the Qaraghandy transmitter is referred to as the hunted location, and the signal propagated by the Qaraghandy transmitter is referred to as the hunted signal.

Figure 3:
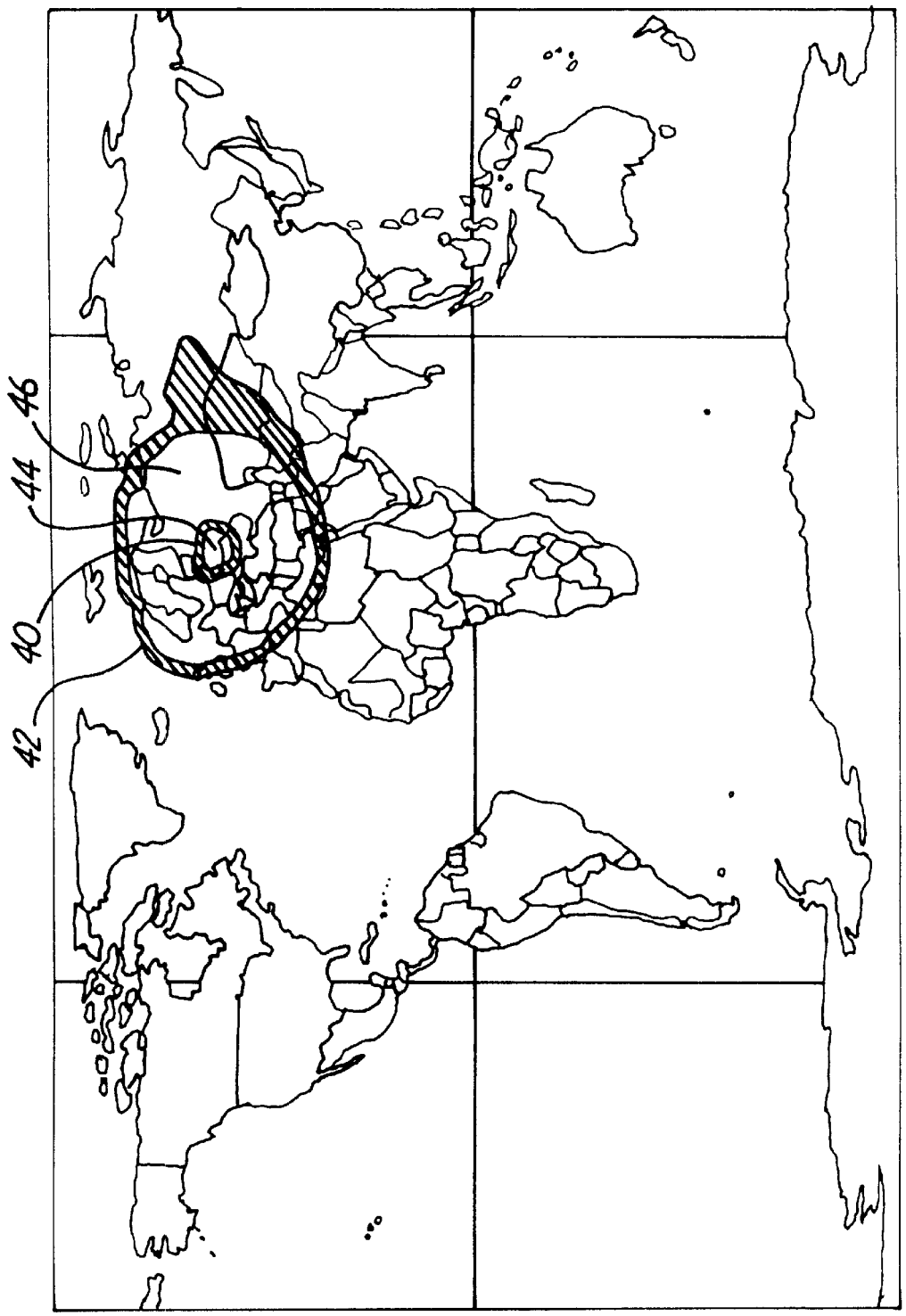
FIG. 3 is a map indicating the location contour for an emitter transmitting the signal observed by a first receiver.

FIG. 3 is a map indicating a location contour for the hunted signal as received by a first receiver. On the map are shown contours 40, 42 corresponding to a possible location of the hunted transmitter. The first receiver is located in Gomel, Belarus, which is located at 52.42N, 31.00E. The first receiver listened to the hunted signal on a frequency of 10 megahertz (MHz) at 12UT on Jun. 21, 2000. To accurately generate the location contours 40, 42 of the hunted transmitter, it is assumed that the power at which the hunted transmitter is broadcasting is 5 kilowatts. Other assumptions are made regarding the hunted signal as well, including that the antenna used was isotropic, had zero gain, and had a bearing of 45 degrees, and that the take-off angle of the hunted signal was 3 degrees. The man made noise at the first receiver is set at −145 decibels.

For the purposes of illustration, these assumptions correspond directly with the data used to generate the propagation coverage map of FIG. 2. However, in actually practicing the invention it may be necessary to make certain assumptions about the type of transmitter being used, as well as the type of antenna being used. The more information that is known about the hunted transmitter, the easier it is to estimate the proper antenna type, signal characteristics, and other transmitter and signal information.

The first receiver observed the hunted signal as having a signal to noise ratio (SNR) of 23.05 decibel-Hertz (dB-Hz). Based on this observed SNR, the map shown in FIG. 3 can be generated indicating the likely location of the hunted transmitter. In addition to the observed SNR, the contours 40, 42 are generated based the location of the first receiver, the time and frequency of the observed signal, and the above data which was assumed relevant to the hunted signal. The contours 40, 42 correspond to that area of the world where a transmitter having the assumed characteristics could be located to propagate the hunted signal having the SNR observed by the first receiver. The contours 40, 42 will typically form a ring around the location of the first receiver. Such is the case for the two generally circular contours 40, 42 located about Gomel. In addition to the two rings 40, 42, a first skip zone 44 is located in the middle of the inner ring 40, and a second skip zone 46 located between the inner ring 40 and the outer ring 42.

Figure 4:
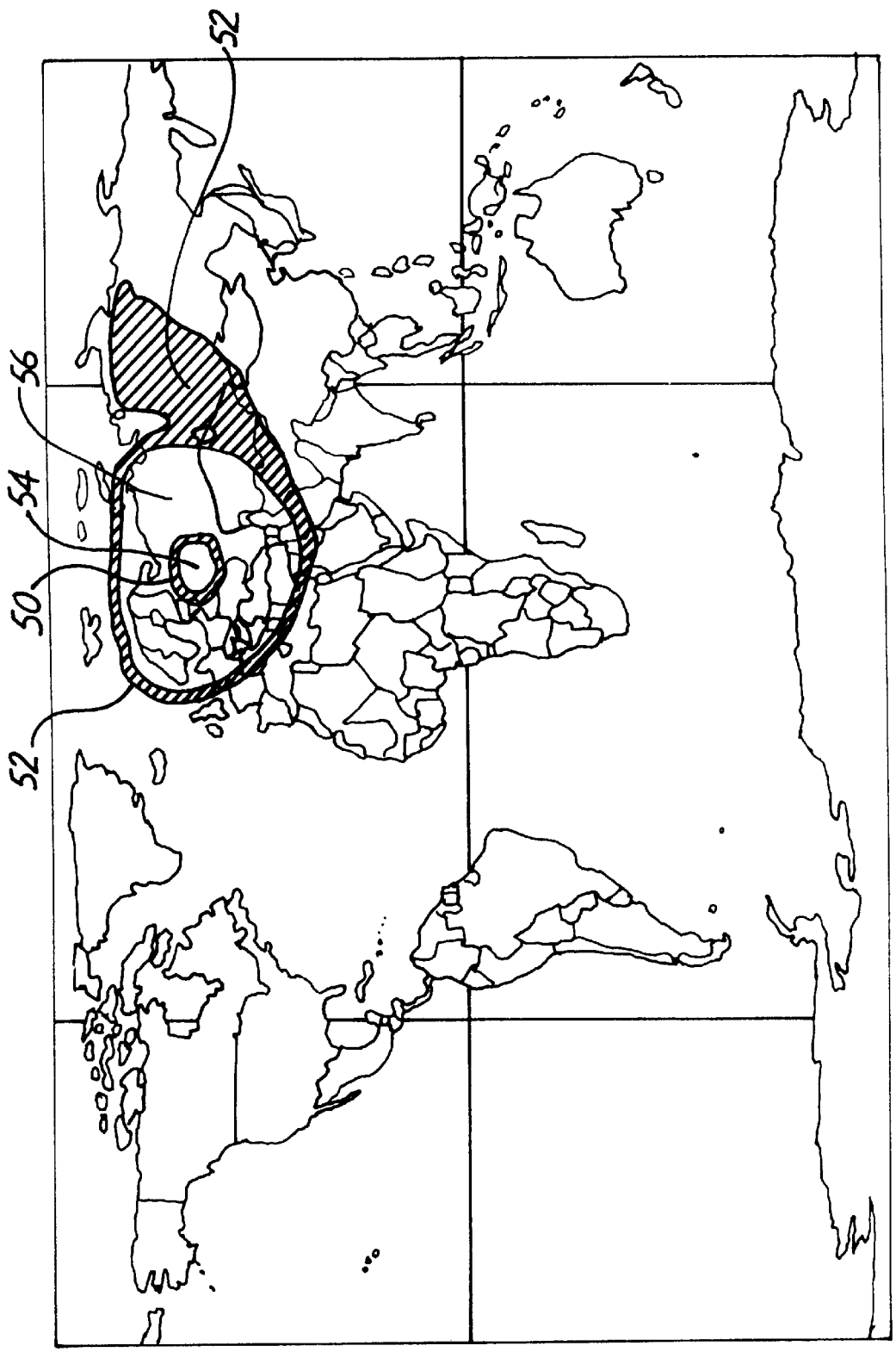
FIG. 4 is a map indicating the location contour for an emitter transmitting the signal observed by a second receiver.

FIG. 4 is a map indicating a location contour for the hunted signal as received by a second receiver. The map comprises contours 50, 52 which correspond to a possible location of the hunted transmitter. The second receiver is located in Moscow, Russia at 55.75N, 37.58E. The second receiver listened to the hunted signal on the same frequency, 10 MHz, at the same time, 12UT Jun. 21, 2000. In addition, the second receiver made the same assumptions regarding the hunted signal as were made by the first receiver in Belarus.

When receiving the hunted signal, the second receiver observed a signal to noise ratio of 25.05 dB-Hz. This observed SNR, along with the assumed data, information regarding the location of the second receiver, and the time and frequency of the signal was used to generate the contours 50, 52 visible on the map. The two contours 50, 52 are very similar to those of FIG. 3, and generally form two rings 50, 52 around Moscow. A first skip zone 54 is located in the middle of the inner ring 50, and a second skip zone is located between the inner ring 50 and the second contour 52. The contours 50, 52 indicate that area of the world where a transmitter having the assumed characteristics would be located to propagate the hunted signal having the signal to noise ratio observed by the second receiver.

Figure 5:
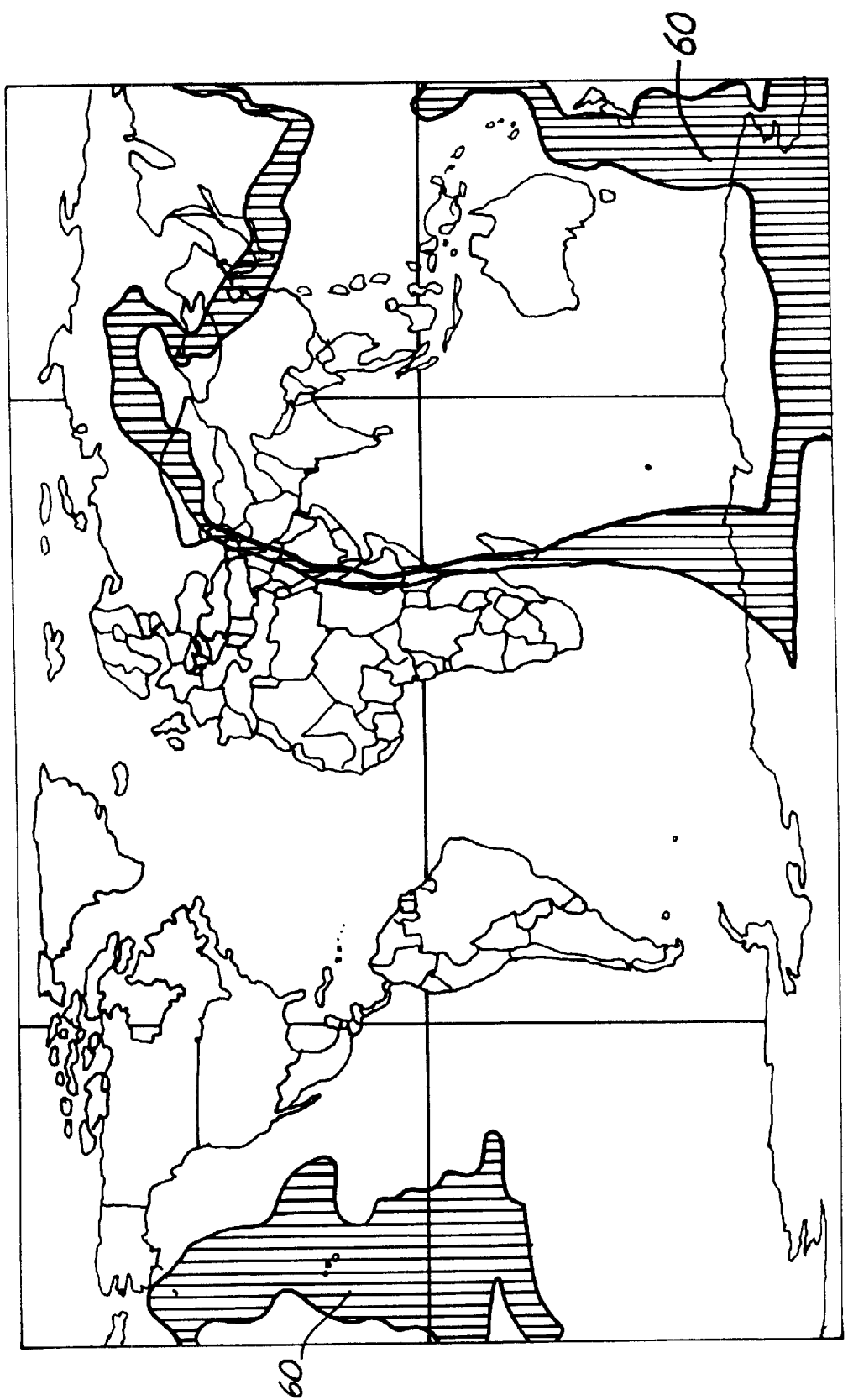
FIG. 5 is a map indicating the location contour for an emitter transmitting the signal observed by a third receiver.

FIG. 5 is a map indicating a location contour for the hunted signal as received by a third receiver. A contour 60 is shown on the map of FIG. 5 corresponding to a possible location of the hunted transmitter. The third receiver is located in Calcutta, India at 11.32N, 75,77E. Just as the first and second receivers, the third receiver listened to the hunted signal at a frequency of 10 MHz at 12UT on Jun. 21, 2000. Also, the third receiver made the same assumptions regarding the hunted signal as were made by the first and second receivers. The third receiver observed a signal to noise ratio of 18.2 dB-Hz. The contour 60 resulting from the signal observed by the third receiver is spread out world wide, and varies greatly from the previous two Figures. The contour 60 is in the form of a larger, more distorted ring around Calcutta, due possibly to the amount of sunlight at time of day the signal was observed. The contour 60 indicates that area of the world where a transmitter having the assumed characteristics would be located to propagate the hunted signal having the signal to noise ratio observed by the third receiver.

Figure 6:
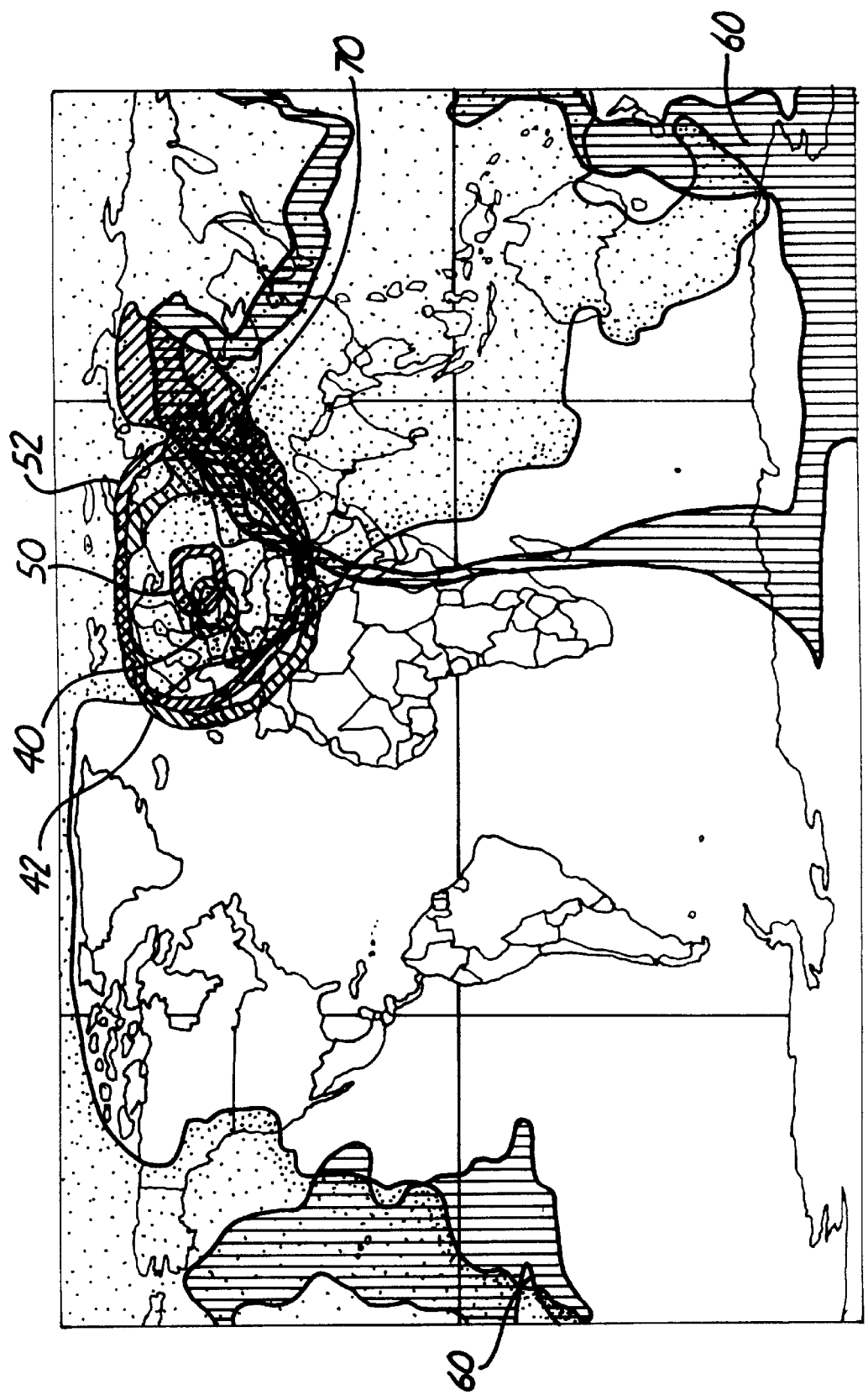
FIG. 6 is a map indicating the intersection of the location contours of the first, second, and third receivers.

To determine the location of the hunted transmitter, the location contours generated for all three receivers are compared. FIG. 6 is an intersection map containing the location contours 40, 42, 50, 52, 60 for all three receivers. When all three location contours 40, 42, 50, 52, 60 are produced on a single map, an intersection location 70 where all three contours 40, 42, 50, 52, 60 overlap can be easily determined. This location of intersection 70 corresponds to the most likely location of the hunted transmitter. As can be seen from the map of FIG. 6, the area of overlap 70 of all three contours occurs in Kazakhstan, which is consistent with the signal propagation contour of the hunted signal illustrated by FIG. 2.

Though the above example discussed determining the location of an unknown emitter using three observation stations, it is not so limited. In fact, adding more observation stations will improve the accuracy of predicting the location of the hunted emitter. Thus, the more contours available to be overlapped, the more likely the final intersection of all contours will accurately define the location of the emitter. Furthermore, it is possible to use data collected from a single observation station to determine the location of an unknown emitter. Both methods are discussed in more detail below.

Figure 7:
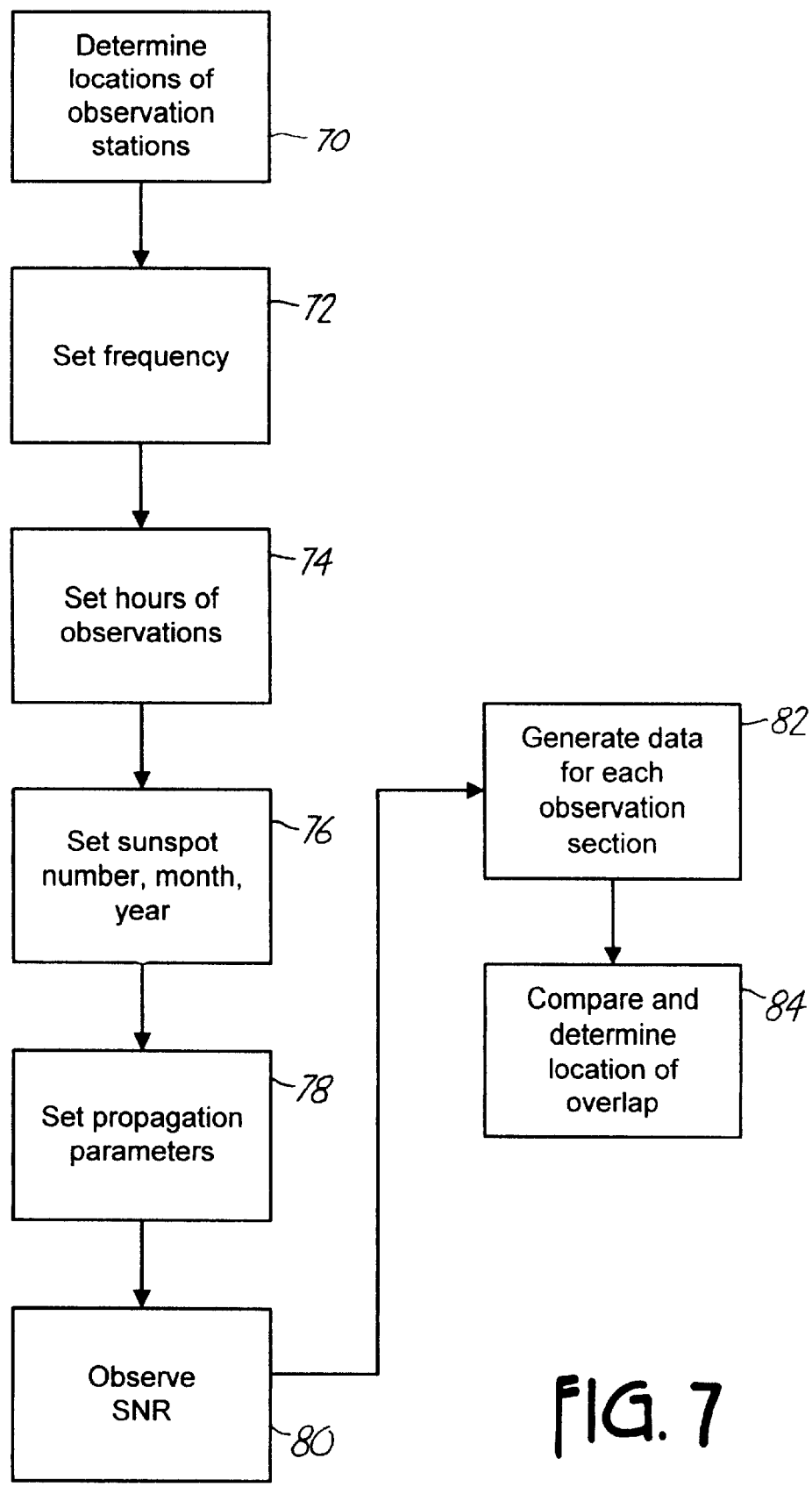
FIG. 7 is a flow diagram illustrating the process for determining a multi-station intersection.

FIG. 7 is a flow diagram indicating the method of determining the location of an unknown emitter based on observations from multiple stations. The first step 70 is to select the locations of a plurality of receivers, or observation stations, which will be listening to the hunted signal. For optimum performance, it is preferred that at least three observation stations be selected. The location of each observation station is typically represented by latitude and longitude coordinates and by name. When using software to implement the present invention, a searchable database containing the coordinates for several cities, towns, or other locations of interest around the world may be used to allow easy identification and selection of numerous observation stations around the world.

Next, each observation station must listen to the hunted signal. The hunted signal is primarily identified based on its frequency and the time it is broadcast. Thus, the next steps involve identifying the frequency of the hunted signal 72 so that each observation station will be able to tune its receiver to receive the signal, and setting the hours of observation 74 so that each observation station will know when to listen. In addition, the effect of solar activity on the signal for the time of propagation must be considered. One method of doing so is to identify a sunspot number for the month and year (SSN-month-year) of the observation, as set forth in the next step 76.

Once again, if using software to implement the present invention, it may be possible to provide a database or list of frequencies associated with the location of each observation station to make it easier to select the appropriate frequency. Similarly, the sunspot number for a month and year can be calculated or looked up in a corresponding database. The hour of observation is generally set using universal time, as is the convention in the industry.

One method of implementing the present invention is to utilize a signal propagation prediction software program. In such a situation, the software may require that additional propagation parameters be entered 78 in addition to the frequency, time, and SSN. For instance, when using VOACAP, it is possible to set certain propagation parameters defining the propagation behavior of the system. Examples of propagation parameters which may be included are the multipath tolerance in milliseconds, a delay tolerance in milliseconds, the minimum takeoff angle, the required reliability, a required SNR, and long path versus short path. It is also possible to set parameters relating to the target antenna, including the minimum and maximum frequency of the antenna, the gain, the bearing in degrees, and the type of antenna, e.g. isotropic. In addition, VOACAP requires certain parameters be entered for the program to run, such as number indicating a desired +/− latitude and longitude in degrees from the observation station to indicate how far to extend the propagation prediction.

In addition to setting certain parameters relating to propagation, it is also possible that software will allow a user to adjust parameters affecting the mapping function used to generate a location contour map. Examples of such plotting parameters include the "fuzziness" of the location contour. Fuzziness corresponds to the value used in painting the intersection plots. For example, with an observed SNR of 30 dB-Hz and a fuzziness of 5 dB, the location contour can be generated with several contours of varying shades. In doing so, a contour representing 30 dB-Hz may be indicated, for instance, by showing the corresponding contour using bright white pixels. Similarly, the map can be shown with black pixels anywhere the SNR is greater than 5 dB away from 30 dB-Hz. Finally, any pixels within 5 dB of 30 dB-Hz may be represented based on a gray scale so that the pixels appear somewhere in between a bright white and black.

In a method involving multiple observation stations, the next step 80 comprises each receiver listening to the set frequency at the set time and observing a parameter associated with the signal. The observed parameter is preferably a signal strength parameter, such as SNR, the median signal to noise ratio for a given required reliability, or the signal power. To distinguish among the observation stations, each station may be assigned a unique identifier, such as a color.

The next step 82 is to generate location data for each observation station. Location data is the coverage predication for the SNR and frequency based on the time of day, location, SSN, estimated power, antenna, and various other propagation parameters, such as local noise, minimum takeoff angle, and multi-path tower tolerance. The location data indicates those areas of the world where a transmitter could be located to propagate the observed signal having the observed signal strength parameter. The location data is based on the frequency of the observed signal, the time it was observed, the SSN-month-year associated with the signal, as well as the observed signal strength parameter collected by the observation station.

One method of generating the required location data so that it can be manipulated in a useful manner is to use a layer paradigm, such as that provided by VOACAP. VOACAP defines the following layers of data: location, frequency, hour, and SSN-month-year. In addition to these layers, the present invention adds to each layer the observed signal strength parameter. Thus, utilizing VOACAP, it is possible to generate location data for each observation station indicating all points on the globe where an emitter capable of propagating the observed signal having the observed signal strength parameter could be located. This data can be used to generate a location contour map, such as those shown above in FIGS. 3–5.

Once location data has been determined for each observation station, the final step 84 of the process is to compare the location data from each of the observation stations and based on the comparison, determine a likely location of the unknown transmitter. The most likely location of the unknown transmitter will be that area of the world where the location data for all observation stations overlaps. In other words, the location of the unknown emitter is an intersection created where location data of all of the observation stations overlaps.

When using a layer paradigm, determining the location of overlap can be accomplished by simply adding all the data layers to find the location of intersection. Locations having the highest sum will correspond to the area where the location data intersects, and thus the most likely location of the emitter. The results of this step may likewise be used to generate a map. The resulting map can be designed to contain each of the location contours associated with each of the observation stations, similar to the map shown in FIG. 6. When mapped this way, the area where all contours overlap is easy to determine visually. This overlap corresponds to the location of the unknown emitter.

If there is not a point of perfect intersection after comparing the contours, it is possible to improve the quality of the intersection by further processing the data near the general location of intersection. One method of doing so is to determine the interpolated average difference from the observed signal level for each respective layer of data in the vicinity of the general location of intersection. For example, if there are two layers of data, and at a location of 25 N, 32S a difference of +2 dB from the observed signal level is observed in the first layer of data, and a difference of –3 dB from the observed signal level is observed in the second layer, an average difference from the observed signal level at that location is 2.5 dB. If the surrounding points have an average difference higher than this, then this location is the most likely point of intersection.

Figure 8:
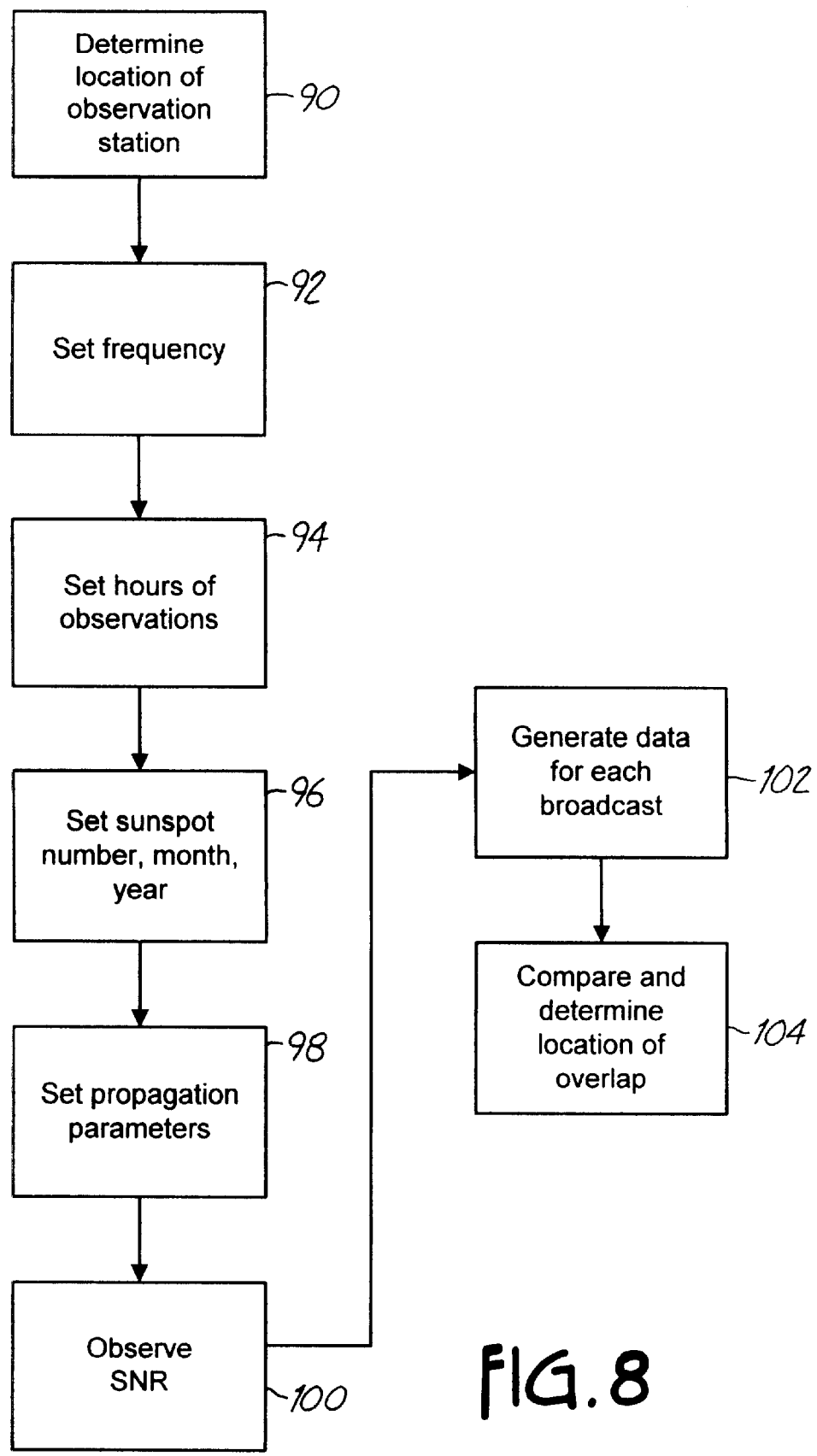
FIG. 8 is a flow diagram illustrating the process for determining a single station intersection.

It is also possible to locate an emitter based on observations collected from a single observation station. FIG. 8 is a flow diagram illustrating the process for determining the location of an emitter using a single observation station. The first step 90 is to identify the location of the observation station. As described above, it is typical for the observation station to be identified by latitude/longitude coordinates, and when using software to implement the present invention, a searchable database may be provided for ease of use.

The next steps 92–96 involve observing the hunted signal at the observation station. When using a single observation station to locate an unknown emitter, it is preferable to attempt to observe the signal many times over a period of time. In some instances, the unknown emitter may broadcast several different times on a variety of frequencies. Due to a distinctive quality of the broadcast signal, such as an identifiable voice, or a particular type of data being transmitted by the signal, such as music or teletyped data, it is possible to deduce that though transmitted on several frequencies at several different times, the broadcast is originating at the same unknown emitter. In such a case, it is desirable to listen to the signal many times on as many frequencies as possible. The more often the emitted signal is observed, the more data there is available when attempting to determine its location, and the more accurate the resulting intersection.

Thus, each time the unknown emitter broadcasts, the frequency of the broadcast must be recorded 92, as well as the time of the broadcast 94. Based on the time of the broadcast, it is possible to determine the appropriate SSN-month-year 96 for each observed broadcast as well.

Next, as described above, certain parameters relating to signal propagation and/or plotting may be set 98. Once again, it is contemplated that VOACAP will be used to generate the underlying data layers of location, frequency, hour, and SSN-month-year. In this step 98, any other relevant parameters required by VOACAP can be entered. In addition, if utilizing a mapping function to display the data layers, it is possible to adjust plotting parameters, as described more fully above, in this step as well.

The next step 100 is to record an observed parameter associated with the broadcast signal for each broadcast. The observed parameter may be observed SNR, the median signal to noise ratio for a given required reliability, or the signal power.

After observing a parameter of the signal, such as SNR, location data is generated for each broadcast 102. Location data indicates those areas of the world a transmitter could be located to propagate a signal having the parameter observed for that broadcast. As described above, one method of generating the required data is to use VOACAP. Similar to the layers of location data generated in the previous method, VOACAP can be used to generate layers of location data for each broadcast corresponding to the location, frequency, hour, and SSN-Month-year. According to the present invention, each layer further includes an observed signal strength.

The final step 104 is to compare the location data generated for each broadcast to determine a likely location of the unknown emitter. As described above, when using a layer paradigm it is possible to simply sum the intersection layers associated with each broadcast. The area where the sum is the highest will correspond to the likely location of the unknown emitter. Just as described above, a map may be generated based on the location data for each observed signal. The resulting map can be designed to show a location contour associated with each observation of the signal. When mapped this way, the area where all contours overlap is easy to determine visually, and will correspond to the location of the unknown emitter.

The above methods are extremely versatile and should allow for several methods of locating a transmitter. For instance, it is possible to do so based on multiple observers on the same frequency at one time, based on multiple observers on the same frequency at multiple time observations, based on a single observer on one frequency at multiple times, based on a single observer on multiple frequencies at the same time, and based on a single observer on multiple frequencies at multiple times.

In addition, it is possible to implement the present invention completely from a desktop computer. It is possible to contemplate using the present invention over a broad network of connected receivers, such as the Internet. Currently, there are a number of receivers throughout the world which are connected to the Internet. Any one of these receivers can be called upon to collect the necessary data and provide it to a particular computer. This chosen computer can then process the collected data using the method disclosed above to determine the location of an unknown emitter.

Although the present invention has been described with reference to preferred embodiments, workers skilled in the art will recognize that changes may be made in form and detail without departing from the spirit and scope of the invention.

What is claimed is:

1. A method of determining the location of a high frequency emitter, the method comprising:
   collecting multiple observations of an emitted signal;
   recording a location of where each observation is made;
   recording a time when each observation is made;
   observing a frequency of the emitted signal;
   observing a signal parameter of the signal for each observation of the signal;
   generating location data for each observation of the signal based on the observed parameter; and
   comparing the location data of the observations to determine a likely location of the high frequency emitter.

2. The method of claim 1 wherein collecting multiple observations of an emitted signal comprises:
   collecting multiple observations of an emitted signal at a single observation station.

3. The method of claim 1 wherein collecting multiple observations of an emitted signal comprises:
   collecting an observation of an emitted signal at multiple observation stations.

4. The method of claim 1 wherein generating location data for each observation comprises identifying an area where an emitter could be located to propagate the emitted signal having the observed parameter.

5. The method of claim 4 and further comprising determining a sunspot number based on the time the emitted signal is observed.

6. The method of claim 5 wherein the area an emitter could be located to propagate the emitted signal is based on the location where the signal was observed, the frequency of the emitted signal, the time at which the emitted signal was observed, and the sunspot number.

7. The method of claim 6 wherein the area an emitter could be located to propagate the emitted signal is identified utilizing VOACAP.

8. The method of claim 1 wherein comparing the location data of the observations to determine a likely location of the high frequency emitter comprises determining an area of intersection where the location data for each observation overlaps.

9. The method of claim 1 wherein observing a signal parameter comprises observing a signal to noise ratio of the signal.

10. A method of determining the location of a high frequency emitter, the method comprising:
    collecting multiple observations at known locations and at known times of an emitted signal at a known frequency;
    observing a signal strength parameter for each signal observation;
    generating location contours for each signal observation based on the known location, known time, known frequency, and observed signal strength parameter of that signal observation; and
    comparing the location contours of the signal observations to determine a likely location of the high frequency emitter.

11. The method of claim 10 wherein collecting multiple observations of an emitted signal comprises:
    collecting multiple observations of an emitted signal at a single observation station.

12. The method of claim 10 wherein collecting multiple observations of an emitted signal comprises:
    collecting an observation of an emitted signal at multiple observation stations.

13. The method of claim 10 wherein the location contours are further based on a sunspot number associated with the time of observation of the emitted signal.

14. The method of claim 13 wherein generating location contours for each signal observation comprises identifying an area where an emitter may be located to propagate the emitted signal having the observed signal strength parameter and based on the location where the signal was observed, the time of the signal observation, at the frequency of the signal, and the sunspot number.

15. The method of claim 14 wherein generating location contours comprises utilizing VOACAP.

16. The method of claim 10 wherein the observed signal strength parameter is an observed signal to noise ratio, a median signal to noise ratio for a given required reliability, or signal power.

17. A method of determining the location of a high frequency emitter, the method comprising:
    collecting multiple observations at a known location and at a known time of an emitted signal at a known frequency;
    associating a sunspot number with the signal observations;
    observing a signal strength parameter for each signal observation;
    utilizing VOACAP to generate location data for each signal observation based on the location, time, frequency, sunspot number, and observed signal strength parameter of that signal observation, wherein the location data corresponds to a location of an emitter capable of broadcasting the emitted signal; and
    determining the likely location of the emitter by comparing the location data of the observed signals to determine an area of intersection where the location data for each signal observation overlaps.

18. The method of claim 17 wherein collecting multiple observations of an emitted signal comprises collecting multiple observations of an emitted signal at a single observation station.

19. The method of claim 17 wherein collecting multiple observations of an emitted signal comprises collecting an observation of an emitted signal at multiple observation stations.

* * * * *